Patented July 12, 1949

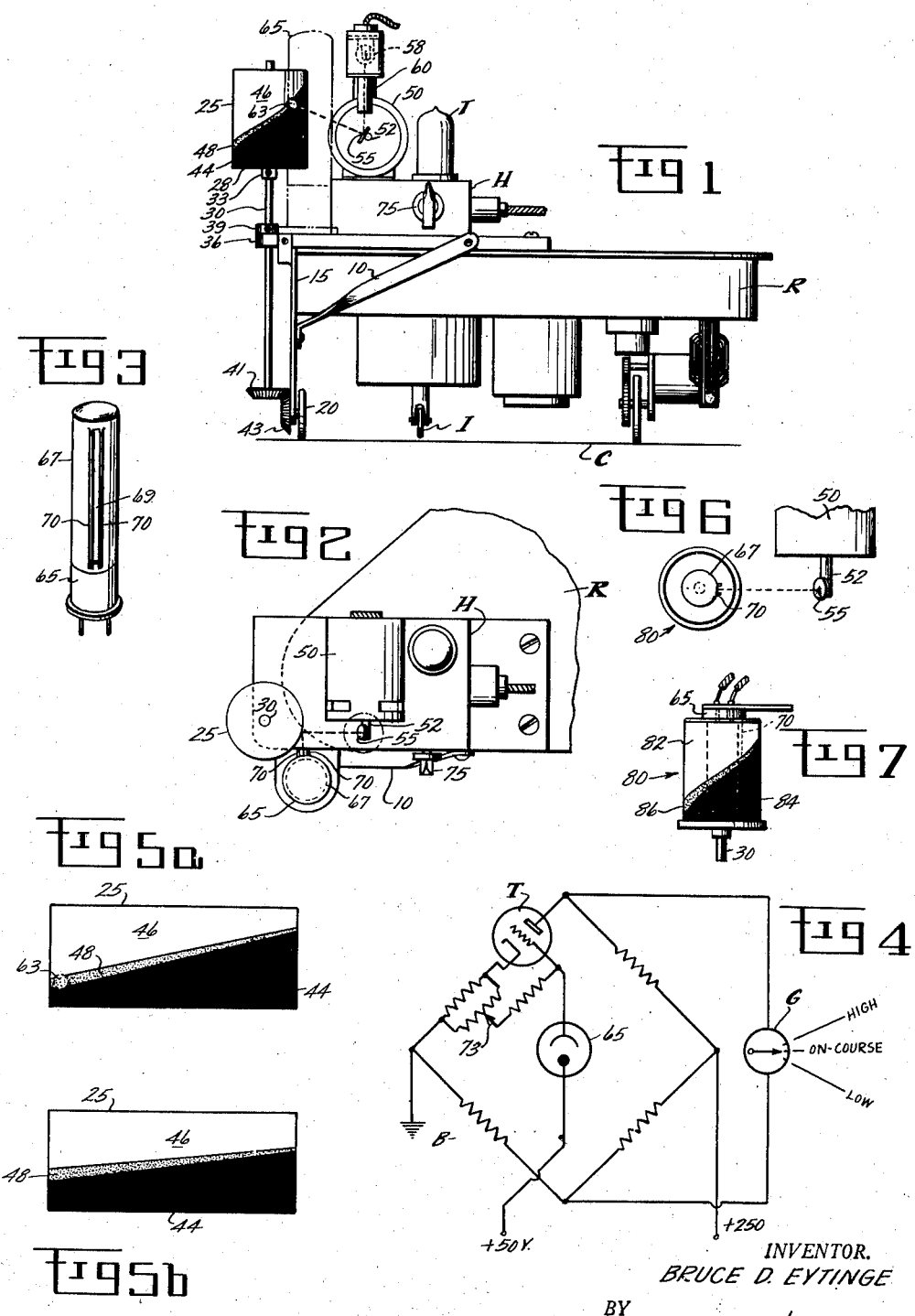

2,475,600

UNITED STATES PATENT OFFICE 2,475,600

GLIDE PATH SIMULATOR FOR LINK TRAINERS

Bruce D. Eytinge, Grand Rapids, Mich.

Application December 11, 1945, Serial No. 634,331

11 Claims. (Cl. 35—10)

(Granted under the act of March 3, 1883, as amended April 30, 1928; 370 O. G. 757)

The invention described herein may be manufactured and used by or for the Government for governmental purposes without payment to me of any royalty thereon.

This invention relates to pilot training devices and more particularly to a device for use in conjunction with a Link trainer for the purpose of simulating aircraft flight along a predetermined glide path, as performed under actual flying conditions by the use of guiding radio waves.

My invention has for an object the provision of means for realistically simulating actual flight experience involved in making a blind landing approach to an air strip guided by conventional glide path radio beams. Such conventional beams generally comprise a pair of diverging radio beams from a common transmitter located at the air strip, and having a region between the pair of beams of equal radiation intensity in so far as signals received therefrom are concerned. The beams are oriented with respect to ground so that an aircraft approaching for a landing is enabled to maintain a predetermined rate of descent, that is, follow a predetermined angle down to the air strip by flying in the region of equal intensity between the diverging beams. Suitable radio apparatus and other equipment is utilized in the aircraft for detecting the beams and for apprising the pilot when he is on course or off course in the sense of being too high or too low with respect to the region of equal intensity, at any particular point in the landing approach.

Another object of my invention is to provide a glide path simulating system wherein simulated angles may be varied by convenient replacement of an element of my system.

A further object of my invention is to provide for a realistic simulation of actual beam reception in so far as concerns a narrowing of the correct glide path progressively as the air strip is approached.

In accordance with the above objects I provide a system comprising a cylinder or drum adapted to be mounted on a conventional Link trainer recorder, including means for rotating the drum in response to traverse of the recorder. The arrangement is such that rotational movement of the drum is effected in proportion to components of traverse of the drum along a predetermined glide path as depicted on a conventional training chart on which the recorder moves, or by components parallel to such predetermined glide path. The surface of the drum is provided with light and dark areas divided by a spirally disposed area of median hue. Also included in the system is a light source adapted to project a ray of light at the drum which traverses the surface of the drum longitudinally in response to simulated altitude changes. A photo-electric cell also mounted on the recorder is arranged to receive reflection of the ray from the drum, the intensity of reflection being determined by the relative positions of the drum and the light ray, depending on whether reflection is had from the light or dark areas or from the area of median hue. The elements thus described are used in conjunction with a suitable electrical circuit including a glide path indicator of the zero center galvanometer type, the arrangement being such that an on course indication is had when the rate of rotation of the drum and the rate of travel of the light ray with respect to the drum are such that reflection from the spirally disposed area of median hue is consistently received by the photo-electric cell. Off course flight is indicated by virtue of reflection substantially from either the light or dark areas which affect the electric circuit in such a manner as to give a high or low indication on the glide path indicator to correspond to particular conditions.

A detailed description of my invention will now be given, in conjunction with the appended drawings, in which:

Fig. 1 is an elevation view showing the elements of my system mounted on a conventional Link trainer recorder with the photo-electric cell and hood shown in dotted lines for the sake of clearness;

Fig. 2 is a plan view of the glide path simulator elements shown in Fig. 1;

Fig. 3 is a perspective view showing details of the hood surrounding the photo-electric cell;

Fig. 4 is a schematic diagram of the electrical circuit utilized in my system;

Figs. 5a and 5b depict developed drum surfaces showing different glide path angle arrangements of the light and dark areas;

Fig. 6 is a plan view of a modification of certain elements of my system; and

Fig. 7 is an elevation view of the modified elements illustrated in Fig. 6.

Attention is now invited to Figs. 1 through 3, wherein a recorder R is shown adapted to move on a radio range chart C in response to manipulation of controls of a Link trainer by a student pilot, all as will be understood by persons familiar with the art. My invention comprises providing recorder R with bracket members 10 and 15 for supporting a pick-up wheel 20 in contact with chart C, and a drum 25. Pick-up wheel 20 is so mounted as to cause disengagement of the inking wheel I from contact with chart C, in order to support more of the weight of the recorder so as to insure rotation of wheel 20 as the recorder moves. Drum 25 may be a simple hollow metal cylinder having a closed end 28 adapted to be removably secured to a shaft 30 by means of a collar and set screw arrangement 33 secured to the closed end 28. Shaft 30 is supported in a bearing 36 by means of a collar and set screw arrangement 39 and extends continuously downward, having a bevel gear 41 secured at the lower end thereof and adapted to engage a bevel gear 43 pinned on the same shaft as the pick-up wheel 20 and supported thus at the lower end of the bracket member 15. The arrangement thus far described provides for rotation of the drum by virtue of rolling contact of pick-up wheel 20 on chart C, the arrangement being such that pick-up wheel 20 is non-swivelly related to the recorder R, being restricted to rotation about its own axis, so that rotation of the wheel will produce rotation of drum 25 only for such components of traverse of the wheel on the chart which are in the plane of the wheel. The ratio of diameters of wheel 20 and gears 41 and 43 is such that drum 25 is provided with substantially a single revolution as wheel 20 traverses the length of the glide path depicted on chart C.

The surface of drum 25 is provided with a black area 44 and a white area 46 with a spirally disposed area 48 of gray therebetween. The developed surface of the drum is shown in Figs. 5a and 5b and it will be noted that the area of median hue, that is, the gray area 48 is of progressively decreasing width in the upward direction for a purpose to be hereinafter described. I have found that in actual practice the colored areas may be provided on a piece of paper which may be wrapped about the drum and secured thereto as by gluing or the like.

Also mounted on recorder R is an autosyn receiver 50, which is connected to the autosyn transmitter conventionally used as part of the altitude indicating system of the Link trainer, and has secured to the shaft 52 thereof a small mirror 55. A light source comprising an electric lamp 58 and a condenser lens system as generally indicated by 60 is mounted above mirror 55 and adapted to project a light beam thereto. The arrangement is such that energization of autosyn 50 in response to simulated altitude changes causes rotation of mirror 55 whereby a light ray from source 58 is reflected from the mirrored surface and plays on the drum surface at some point thereon depending on the relative extents of rotation of the mirror and the drum at any particular instant. As shown in Fig. 1 the light spot 63 is the point of impingement of a reflected ray from mirror 55 on the drum, such point being in this case astride the area of median hue 48. A photo-electric cell 65 shown in phantom outlines in Fig. 1 and in perspective in Fig. 3 is mounted on the recorder and is provided with a hood 67 having a slot 69 laterally shaded by outturned flanges 70 of hood 67. The arrangement is such that the light spot 63 reflected from any point on the surface of the drum to the photoelectric cell through slot 69 will cause a response of the cell in proportion to the intensity of reflection from the drum surface which is determined by the area on which the light spot plays at any particular time. In other words, reflection from area 46 will be greater in intensity than that from area 44, whereas reflection from area 48 will be of generally median intensity, it being noted that when the light spot is symmetrically astride area 48 a certain amount of white and black area reflection is effected, which reflections balance each other photo-electrically and accordingly affect the photo cell as the equivalent of gray area.

Attention is now invited to Fig. 4 which shows the electrical circuit used in conjunction with the elements heretofore described and which may be seen to comprise a conventional resistance bridge wherein, however, one leg comprises a triode T, having variable resistance means 73 adjustable by means of a knob 75 (Fig. 1). The electrical circuit, except for a zero center galvanometer comprising the glide path indicator G, is inclosed in a housing H mounted on the recorder R. Voltage connections to the bridge, as shown in Fig. 4, are such that it may be balanced by varying the output of triode T by means of potential impressed on the grid thereof by suitable adjustment of variable resistance 73. When the bridge is balanced glide path indicator G will show an on course reading.

Grid voltage, however, is also subject to photoelectric response of cell 65 suitably connected to the grid, as shown in Fig. 4, and accordingly resistance 73 is adjusted to balance the bridge when light spot 63 is astride gray area 48 prior to operation of the system. Accordingly, an unbalance of the bridge is effected at such times as light spot 63 strikes substantially above or below area 48, causing variation in reflected intensity from the drum to the photo-electric cell corresponding to off course flight, the grid voltages of the triode T being affected accordingly and the unbalanced condition being operative to provide a corresponding high or low indication on the indicator G.

In operation, the recorder R is oriented on chart C in such a manner that wheel 20 is aligned with the simulated glide path direction depicted on the chart and the trainer altimeter is set to zero. Wheel 20 should then be lifted slightly from the chart and manually rotated so that the light spot 63 strikes at the lowest point of the spirally disposed area 48 as shown in Fig. 5a, which point is the widest portion of the gray area and corresponds to the beginning of the landing approach. Knob 75 is then adjusted to balance the bridge so as to effect an on course reading of indicator G. The student then starts the problem of following the proper glide path angle for the length of the landing approach and so long as simulated flight is correct, the rotation of drum 25 and mirror 55 will be synchronized so that light spot 63 remains astride spiral area 48 in substantially symmetrical relationship therewith so that the overlapping white and black areas at the sides of the light spot will compensate each other photo-electrically. Under such conditions the bridge circuit of Fig. 4 will remain balanced and an on course reading of indicator G will be continuously effected. Where, however, deviations from the correct glide path direction are made, drum 25 and mirror 55 will no longer rotate in synchronized relationship. In other words, light spot 63 will deviate from area 48 for the reason that wheel 20 only registers that component of recorder travel in the direction of, or parallel to, the correct flight path having once been aligned therewith. Accordingly, a high or low reading will be correspondingly effected on the indicator G, all as heretofore described. Further, due to the progressively narrowing aspect of the gray path, deviation therefrom is more critical in effect as the simulated distance to the air strip diminishes during the course of flight, thereby realistically simulating actual conditions.

Attention is now invited to Figs. 5a and 5b which show developed surfaces of drum 25 depicting a steeper glide path in Fig. 5a than is found in Fig. 5b. It will thus be understood how a predetermined glide path angle may be chosen for any particular problem by providing a number of drums having glide path angle variations depicted thereon of varying value, or alternately, by providing paper collars which may be interchangeably slipped over a drum and frictionally held thereon, the outer surfaces of the paper collars carrying areas of light and dark hue with an intermediate area of median hue, each collar corresponding to a predetermined angle of glide.

It will be appreciated that my invention is not limited to the specific elements described above but may, in fact, be modified as shown in Figs. 6 and 7 wherein like reference characters for similar parts as found in Fig. 1 are used, and which show a translucent drum 80 of film-like material similar to that used for photographic negatives and which is prepared with light and dense areas 82 and 84, respectively, with an intermediate area of median density 86, the arrangement being similar to the corresponding light and dark areas of drum 25 in Figs. 1 through 5. In the modification of Figs. 6 and 7 the photoelectric cell 65 is adapted to be supported inside drum 80, the arrangement being such that the light ray from mirror 55 impinges on the surface of drum 80 and is transmitted through the translucent material and modulated in intensity prior to reception by cell 67, depending on the particular translucency of the point at which transmission through film 80 is had. The remainder of the system described in Figs. 1 through 5 is operative in conjunction with the modified elements of Figs. 6 and 7, as will be easily understood.

Having thus described my invention, I claim:

1. In a device for providing glide path flight training for use in conjunction with an instrument flight training unit having a recorder adapted to traverse a chart of a simulated landing approach in response to controls manipulated by a student pilot, said device including means having a surface member comprising a surface divided into a light area and a dark area with an intermediate area of median hue therebetween, a light source adapted to impinge a light beam on said surface, an electric circuit including photo-electric cell means adapted to receive reflected light energy from the direction of said surface, and including simulated glide path indicator means, means for producing motion of said light beam in such a manner as to vary the point of impingement with respect to said areas in response to simulated altitude changes, and means for producing motion of said surface member in response to traverse of said recorder in simulating a landing approach, the arrangement being such that response of said photo-electric cell means to light energy of said beam under control of said surface is controlled by the relative position of said source light beam with respect to the areas of said surface, said electric circuit including a resistance bridge to effect an on course indication of said simulated glide path indicator means when said light beam is directed at said area of median hue.

2. In a device as set forth in claim 1, wherein said surface comprises a film having areas of graduated translucency corresponding to said light, dark and intermediate hue areas, said light source being arranged on one side of said film, and said photo-electric cell means on the other side thereof, whereby said light beam is transmitted through said film to said photo-electric cell means.

3. In a device as set forth in claim 1, wherein said surface comprises an opaque member having said light, dark and intermediate hue areas thereon, the arrangement being such that said light beam reflects from said surface to said photo-electric cell means.

4. In a device for providing glide path flight training for use in conjunction with an instrument flight training unit having a recorder adapted to traverse a chart of a simulated landing approach in response to controls manipulated by a student pilot, said device including a surface member having a surface divided into a light area and a dark area with an intermediate area of median hue therebetween, a light source adapted to direct a light beam at said surface, an electric circuit including photo-electric cell means adapted to receive light reflected from said surface, and including a simulated glide path indicator means, means for producing relative motion between said light beam and said surface in one direction in response to simulated changes in altitude, means for producing relative motion between said light beam and said surface in another direction in response to traverse of said recorder in simulating a landing approach, the degree of response of said photo-electric cell means to light reflected from said surface being controlled by the relative position of the light beam impingement with respect to the areas of said surface, and said electric circuit including a resistance bridge to effect an on course indication of said simulated glide path indicator means when said light beam is directed at said area of median hue.

5. In a device as set forth in claim 4, wherein said surface comprises a drum adapted to rotate proportionally in response to traverse of said recorder in the direction of the glide path, said areas comprising a white area, a black area and a comparatively narrow gray area therebetween, the arrangement of said areas being such that said gray area is disposed spirally about said drum.

6. In a device as set forth in claim 4, wherein said resistance bridge includes a triode in one leg thereof, and means connecting said photo-electric cell means to said triode so as to vary the grid potential in response to the intensity of light received by said cell means, said simulated glide path indicator means comprising a zero center galvanometer connected across said bridge and adapted to indicate an on course reading when said bridge is balanced, the arrangement being such that the potential drop across said triode leg balances said bridge when said cell means is subjected to light of predetermined intensity substantially from said area of median hue.

7. In a device as set forth in claim 4, wherein said surface member is cylindrically arranged and adapted for rotation about the cylindrical axis, means for mounting said member on said recorder, and wherein the means for producing relative motion between said light beam and said surface in another direction comprises driving means for rotating said member in response to traverse of said recorder in a predetermined glide path direction, the arrangement being such that said member rotates substantially one revolution in the distance traversed by said recorder for a predetermined length of glide path.

8. In a device as set forth in claim 4, wherein said light source comprises an electric lamp, a rotatable mirror, and wherein the means for producing relative motion between said light beam and said surface in one direction comprises an autosyn receiver for rotating said mirror in response to simulated altitude changes, the arrangement being such that rays from said lamp are reflected from said mirror to said surface member and adapted to scan said surface in response to rotation of said mirror.

9. In a device as set forth in claim 4, wherein said surface member is cylindrically arranged and adapted for rotation about the cylindrical axis, means for mounting said member on said recorder, and wherein the means for producing relative motion between said light beam and said surface in another direction comprises driving means for rotating said member in response to traverse of said recorder in a predetermined glide path direction, said driving means comprising a wheel fixed to said recorder so as to be rotatable only in response to components of recorder traverse in the plane of said wheel, said wheel being adapted to be driven by physical contact with said chart, the arrangement being such that said member rotates substantially one revolution in the distance traversed by said recorder for a predetermined length of glide path.

10. In a device for providing glide path flight training for use in conjunction with an instrument flight training unit having a recorder adapted to traverse a chart of a simulated landing approach in response to controls manipulated by a student pilot, wherein said unit comprises an altimeter system arranged to actuate an autosyn receiver proportionally in response to simulated altitude changes, said device comprising means having a surface divided into a light area and a dark area with an intermediate area of median hue therebetween, a light source comprising a mirror adapted to direct a light beam at said surface, an electric circuit including photo-electric cell means adapted to receive reflected light from said surface, and including simulated glide path indicator means, means comprising an autosyn receiver for rotating said mirror so as to scan said areas in response to simulated altitude changes, and means for producing motion of said surface in response to traverse of said recorder in simulating a landing approach, the arrangement being such that response of said photo-electric cell means to light from said surface is controlled by the relative positions of said light beam and the areas of said surface, said electric circuit including bridge means to effect an on course indication of said simulated glide path indicator means when said light beam is directed at said area of median hue.

11. In a device for providing glide path flight training for use in conjunction with an instrument flight training unit having a recorder adapted to traverse a chart of a simulated landing approach in response to controls manipulated by a student pilot, said device comprising means having a light intensity control means comprising a member having light and dark areas with an intermediate area of median hue therebetween, a light source adapted to direct a light beam at said member, an electric circuit including photo-electric cell means adapted to receive reflected light from said member, and comprising simulated glide path indicator means, a plurality of means for producing a plurality of relative motions between said light beam and said member, one of said relative motions being in response to simulated changes in altitude and another being in response to traverse of said recorder in simulating a landing approach, the arrangement being such that the degree of response of said photo-electric cell means to light from said member is controlled by the relative position of said light beam with respect to said light and dark areas, said electric circuit including bridge means to effect an on course indication of said simulated glide path indicator means when said light beam is directed at said area of median hue so as to present a predetermined intensity of light to said cell means.

BRUCE D. EYTINGE.

REFERENCES CITED

The following references are of record in the file of this patent:

UNITED STATES PATENTS

| Number | Name | Date |
|---|---|---|
| 2,332,523 | Norden et al. | Oct. 26, 1943 |
| 2,366,603 | Dehmel | Jan. 2, 1945 |
| 2,429,597 | Andrews | Oct. 28, 1947 |
| 2,448,544 | Muller | Sept. 7, 1948 |
| 2,454,503 | Crane | Nov. 23, 1948 |
| 2,457,130 | Crane | Dec. 28, 1948 |